3,574,127
COMPOSITIONS PREPARED BY TREATING
  DIAMINE-KETONE MIXTURES WITH ANHY-
  DROUS DRYING AGENTS
Anthony S. Scheibelhoffer, Barberton, Ohio, assignor to
  The Goodyear Tire & Rubber Co., Akron, Ohio
No Drawing. Original application Jan. 30, 1967, Ser. No.
  612,347, now Patent No. 3,463,748, dated Aug. 26,
  1969. Divided and this application Aug. 22, 1969, Ser.
  No. 852,482
Int. Cl. C07b 5/02
U.S. Cl. 252—184                                  9 Claims

ABSTRACT OF THE DISCLOSURE

A composition and its method of preparation, prepared by treating a mixture of at least one diamine, where the amino groups of the diamine are connected to non-benzenoid carbon atoms and at least one liquid ketone with a drying agent inert to diamines and ketones. The composition is particularly useful as a curative for isocyanate-terminated polyurethanes.

This application is a division of application Ser. No. 612,347, filed Jan. 30, 1967, now Pat. No. 3,463,748.

This invention relates to a method of preparing polyurethanes. More particularly, the invention relates to a method of controlling the reaction rate of a diamine and an isocyanate terminated polyurethane.

Useful cured polyurethanes can be prepared by reacting curing agents such as various diamines, wherein the amino groups of the diamines are attached to non-benzenoid carbon atoms, with various isocyanate-terminated polyurethanes. Suitable isocyanate terminated polyurethanes for this invention are usually prepared by reacting polyisocyanates, wherein isocyanato groups of the polyisocyanates are attached to nonbenzoid carbon atoms, with reactive hydrogen-containing polymeric materials by methods known to those skilled in the art. The various diamines can then be selected to react with the isocyanate-terminated polyurethanes to cure the polyurethanes at different rates ranging from fast curing rates such as a few seconds to very slow curing rates such as several hours or more. In many applications it is desired to react the diamines in ketone diluents with the isocyanate terminated polyurethanes to prepare cured polyurethanes which have useful physical properties and which show negligible discoloration upon exposure to oxygen and ultraviolet light. However, it has been found the various diamines when mixed with certain ketone diluents generally cure the various isocyanate terminated polyurethanes at rates too fast to be commercially useful.

Therefore, it is an object of this invention to provide a method of regulating or reducing the reaction rate of certain isocyanate-terminated polyurethanes with certain curative mixtures comprising certain diamines and ketones.

In accordance with this invention it has been found unexpectedly that a method of controlling by reducing the reaction rate of a reaction mixture prepared by mixing a curative mixture of a diamine and a ketone with an isocyanate-terminated polyurethane, comprises treating a curative comprising at least one diamine, where the amino groups of the diamine are attached to carbon atoms and at least one liquid ketone with a nonreactive drying agent and reacting the treated curative with at least one isocyanate terminated polyurethane, the said isocyanate terminated polyurethane comprising the reaction product of a polyisocyanate, where the isocyanato groups of the polyisocyanate are attached to nonbenzenoid carbon atoms, and a reactive-hydrogen containing polymeric material.

It is generally preferred that the solubility of the liquid ketone is at least 1 gram of the ketone per 100 milliliters of water at 20° C., and that the diamine is at least slightly soluble in water at 20° C. It is also generally preferred that the carbon-to-oxygen ratio of the liquid ketone is from 2.5 to about 7, and that the carbon-to-nitrogen ratio of the diamine is from 1 to about 7, where the sum of the carbon-to-oxygen ratio of the ketone and the carbon-to-nitrogen ratio of the diamine is from about 3.5 to about 11. In the practice of this invention it is usually more preferred that the solubility of the liquid ketone is at least 1.5 grams of the ketone per 100 milliliters of water at 20° C., and carbon-to-oxygen ratio of the liquid ketone is from 3 to 4.

Various diamines can be used in the practice of this invention. Representative examples of suitable diamines wherein the amino groups of the diamines are attached to nonbenzoid carbon atoms, are aliphatic diamines, cycloaliphatic diamines, and aryl aliphatic diamines. Exemplary of the diamines are ethylene diamine, hexamethylene diamine, isophorone diamine, 1,4-cyclohexane bis methylamine, 4,4'-diaminodicyclohexylmethane and m-xylylene diamine.

Various ketones can be used in this invention for the aliphatic diamine-ketone mixture. Suitable ketones are ketones which are liquid at about 25° C., have carbon-to-oxygen ratios of from 2.5 to about 7, and have from 3 to about 7 carbon atoms. Representative examples of the ketones are acetone, methyl ethyl ketone, methyl isobutyl ketone, methyl isoamyl ketone and acetyl acetone.

In the practice of this invention usually sufficient amounts of the ketone are added to the diamine to disperse or dissolve the diamine. Generally from about 1 to about 5 parts of ketone are used per part of diamine although more or less amounts can be used.

The mixture of diamine and ketone can be treated by various nonreactive drying agents that will not adversely affect the reaction of the diamine and the isocyanate-terminated polyurethane by various methods known to those skilled in the art. Representative examples of suitable drying agents are water-absorbing materials and water-hydrating materials. Generally, suitable water-hydrating materials are substantially anhydrous solid granular inorganic salts capable of having a water of hydration by combining with water. Representative examples of such inorganic salts are magnesium sulfate, calcium sulfate, calcium chloride, calcium oxide, sodium sulfate and sodium carbonate. Usually magnesium sulfate, calcium sulfate, and calcium oxide are preferred as normally commercially available drying agents.

The diamine-ketone mixture can be treated by a drying agent such as a solid water-absorbing material or a water-hydrating material over a wide temperature range such as from about 20° C. to about 100° C. The treatment can be conducted at atmospheric pressure or above or below atmospheric pressure although usually at least the autogenous pressure of the mixture is used. Usually the diamine-ketone mixture is treated with the drying agent in an amount of from about 0.1 to about 0.5 part or more of drying agent per part of the diamine-ketone mixture for about 10 minutes to about 24 hours or more, if desired. The drying agent is then usually removed from the mixture by decanting, filtering, or other suitable means and the diamine-ketone mixture is usually used immediately after its treatment with the drying agent.

The isocyanate terminated polyurethanes used in this invention are products of polyurethane reaction mixtures comprising reactive hydrogen-containing polymeric materials and polyurethane organic polyisocyanates wherein the isocyanato groups of the polyisocyanate are connected to a non-benzenoid carbon atom. Usually a solvent can be added to the polyurethane reaction mixture so that it will be in the form of a fluid mixture or solution. If a solvent is to be used, generally sufficient solvent is added to form a solution containing from about 40 to about 65 percent solids. However, a higher or lower concentration of solids can be used. When the solids concentration is low, the individual applications will deposit a thin layer of the polyurethane polymer, and a large amount of the solvent will have to be removed during the curing process. A solids concentration of 45 percent or higher is generally desired.

The reactive hydrogen-containing polymeric material used to prepare the polyurethane comprises at least one member selected from the group consisting of polyester polyols, polyester-amides, polyether polyols, dihydroxy-terminated polymers of conjugated diene hydrocarbons, and castor oil. The reactive hydrogen-containing material generally used has a molecular weight between about 700 and about 5000 and, usually, between about 1000 and about 3000. Generally, the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about one to 20 percent by weight of a triol or higher polyfunctional polyol or polyfunctional acid can be present to produce branching in the polyurethane polymer.

Polyether polyols useful in preparing the polyurethanes of this invention can be prepared by polymerizing or copolymerizing alkylene oxides such as ethylene oxide, propylene oxide, and butylene oxides, by polymerizing or copolymerizing the low-molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethylene ether glycols, polyalkylene ether-thioether glycols or triols, and alkyd resins. Generally, the polytetramethylene ether glycols are the preferred polyether glycols.

Representative examples of dihydroxy-terminated polymers of conjugated diene hydrocarbons are dihydroxy-terminated polymers of isoprene and butadiene and their copolymers with minor amounts of vinyl compounds such as styrene and acrylonitrile.

Polyesteramides may be prepared by reacting a diamine, a glycol, and a dicarboxylic acid under conditions which will remove the water of condensation. Representative glycols and dicarboxylic acids useful in preparing polyesteramides are those useful in preparing polyesters, examples of which have already been shown. Various diamines may be used in forming the polyesteramides, representative of which are ethylene diamine, hexamethylene diamine, decamethylene diamine, cyclohexyl diamine, phenylene diamine, methylene dianiline, toluidine diamine, dichlorobenzidine, and methylene-bis-chloroaniline.

The organic polyisocyanates used to prepare the isocyanate-terminated polyurethanes include various aliphatic and alicyclic organic diisocyanates and mixtures thereof.

Representative examples of such polyisocyanates include 1,6-hexamethylene diisocyanate, 1,10-decamethylene diisocyanate, 1,4-cyclohexylene diisocyanate, 4,4'-methylene-bis(cyclohexylisocyanate) and 1,5-tetrahydronaphthalene diisocyanate, and mixtures of such diisocyanates.

The isocyanate terminated polyurethanes of this invention are usually prepared by reacting a reactive hydrogen-containing polymeric material with the organic polyisocyanate in proportions such that the ratio of isocyanate groups to the reactive hydrogen-containing groups of the reactive hydrogen-containing polymeric material is from about 1.1/1 to about 12/1 and preferably about 1.2/1 to about 2.5/1. These materials are generally reacted at temperatures from about 20° C. to about 150° C. The reactive hydrogens of the reactive hydrogen-containing polymeric material are supplied by hydroxyl groups and amino groups.

Other methods known to those skilled in the art of preparing isocyanate-terminated polyurethanes with or without solvents being present may also be used.

Any of the nonreactive solvents normally used in making paints which are suitable for spraying are useful as diluents for the isocyanate-terminated polyurethanes of this invention. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, Cellosolve acetate, dioxane, lower nitraparaffins, etc. Mixtures of solvents may be used to obtain satisfactory spreading properties and evaporation rates, particularly when the polyurethane is to be used as a spray composition and applied to a suitable surface.

The isocyanate-terminated polyurethane, sometimes called a prepolymer, is usually dissolved or dispersed in the solvent to form a solution or dispersion which is then reacted with the treated diamine-ketone mixture to form a cured polyurethane. The diamine is usually added to the isocyanate-terminated polyurethane in a ratio of from about 0.5/1 to about 1.5/1 and, preferably, about 0.8/1 to about 1.0/1 amine groups of the diamine for each isocyanate group in excess of the reactive hydrogen groups of the reactive hydrogen-containing polymeric material.

The following illustrative examples are set forth to further exemplify the objects and advantages of the invention. The parts and percentages are by weight unless otherwise indicated.

EXAMPLE I

An isocyanate terminated polyurethane (herein called a prepolymer) was prepared by reacting a polyester with a diisocyanate according to the following method. A polyester having a molecular weight of about 1900 and a hydroxyl number of 60, was prepared by the condensation of adipic acid with an excess of a mixture of 80 percent by weight ethylene glycol and 20 percent by weight propylene glycol. To a suitable reactor was charged 100 parts of the polyester which was degassed under a reduced pressure of about 10 to about 40 millimeters of mercury at a temperature of from about 90° C. to about 100° C. While stirring the prepared polyester, 28.3 parts of molten 4,4'-dicyclohexyl-methane diisocyanate was added to the reactor at atmospheric pressure. This reaction mixture was stirred for 50 minutes at a temperature of about 90° C. to 120° C. at atmospheric pressure. The pressure was then gradually reduced to about 10 to 20 millimeters of mercury to degas the mixture for a period of 30 minutes. This prepared prepolymer had an isocyanate content of 3.5 percent and was diluted as follows:

| | Parts |
|---|---|
| Prepolymer | 100 |
| Methyl ethyl ketone | 30 |
| Toluene | 30 |
| Cellulose acetate butyrate solution (10% by weight in Cellosove[1] acetate) | 5 |
| Diluted prepolymer | 165 |

[1] A trade name used to designate monomethyl ether of ethylene glycol acetate.

The diluted prepolymer had an isocyanate content of about 2 percent.

A curative solution for curing this prepared isocyanate polyurethane was prepared by mixing 100 parts of 1,4-cyclohexane (bis methylamine) and 400 parts methyl ethyl ketone.

A portion of the prepared isocyanate terminated polyurethane was cured by mixing 100 parts of the diluted prepolymer with 17 parts of the freshly prepared curative solution at a temperature of about 25° C. The resulting mixture immediately gelled and thus a film of cured polyurethane could not be prepared.

Another portion of the prepared isocyanate terminated polyurethane was cured at about 25° C. by mixing 100 parts of the diluted prepolymer with 17 parts of the curative solution which had been allowed to stand for 24 hours at about 25° C. The mixture had an 8 minute pot life and was spread onto a polyethylene surface to form a film having a thickness of about 12 mils and an ultimate tensile strength of 4600 pounds per square inch at an elongation of 640 percent.

Pot life or gel time is a period of time used by those skilled in the art to designate the period of time between when the curing agent is added to the isocyanate-terminated polyurethane and when the resulting reaction mixture has cured or gelled to the extent that it cannot be brushed or sprayed by conventional methods to form a smooth film.

EXAMPLE II

An isocyanate-terminated polyurethane (the prepolymer) was prepared according to the method of Example I.

A curative solution was then prepared by heating a mixture of 100 parts of 1,4-cyclohexane (bis methylamine) and 400 parts methyl ethyl ketone to about 66° C. for about 12 minutes. The mixture was cooled to about 25° C. and allowed to stand for about 2 hours. Methyl ethyl ketone removed from the mixture by evaporation was replaced.

A portion of the prepared isocyanate terminated polyurethane was cured at about 25° C. by mixing 17 parts of the curative solution with 100 parts of the diluted prepolymer prepared according to Example I. This mixture had a pot life of 8 minutes. The mixture was used to prepare a film of cured polyurethane having a thickness of about 15 mils and an ultimate tensile strength of 6000 pounds per square inch at an elongation of 760 percent.

Another portion of the prepared isocyanate terminated polyurethane was cured at about 25° C. by mixing 100 parts of the diluted prepolymer with 17 parts of the curative solution which had been treated by adding 3.4 parts of anhydrous calcium sulfate to the curative solution and allowing it to stand for about 48 hours at about 25° C. The calcium sulfate was removed before adding the curative solution to the isocyanate-terminated polyurethane. The mixture had a pot life of 21 minutes. A film was prepared from the mixture immediately after mixing the curative solution with polyurethane by casting the mixture on a polyethylene surface. The film was tack-free in about 10 minutes after casting and could be stripped from the polyethylene surface in about 17 minutes. The film had a thickness of about 12 mils, an ultimate tensile strength of 5400 pounds per square inch and an elongation of 580 percent.

EXAMPLE III

An isocyanate-terminated polyurethane (the prepolymer) was prepared according to the method of Example I.

A curative solution was then prepared by heating a mixture of 100 parts of 1,4-cyclohexane (bis methylamine) and 400 parts methylisobutyl ketone to about 66° C. for about 12 minutes. The mixture was cooled to about 25° C. and allowed to stand for about 15 hours. Methylisobutyl ketone removed from the mixture by evaporation was replaced.

A portion of the prepared isocyanate terminated polyurethane was cured at about 25° C. by mixing 17 parts of the curative solution with 100 parts of the diluted prepolymer prepared according to Example I. This mixture had a pot life of 32 minutes. The mixture was used to prepare a film of cured polyurethane having a thickness of about 12 mils and an ultimate tensile strength of 5900 pounds per square inch at an elongation of 600 percent.

Another portion of the prepared isocyanate terminated polyurethane was cured at about 25° C. by mixing 100 parts of the diluted prepolymer with 17 parts of the curative solution which had been treated by adding 3.4 parts of anhydrous calcium sulfate to the curative solution and allowing it to stand for about 24 hours at about 25° C. The calcium sulfate was removed from the curative solution before mixing the curative solution with the polyurethane. The mixture had a pot life of 60 minutes. A film was prepared by casting the mixture immediately after its preparation onto a polyethylene surface. The mixture cured to form a film having a thickness of about 15 mils, an ultimate tensile strength of 4100 pounds per square inch and an elongation of 550 percent.

EXAMPLE IV

An isocyanate-terminated polyurethane (the prepolymer) was prepared according to the method of Example I.

A curative solution was then prepared by heating a mixture of 100 parts of hexamethylene diamine and 400 parts methyl ethyl ketone to about 66° C. for about 12 minutes. The mixture was cooled to about 25° C. and allowed to stand for about 24 hours. Methyl ethyl ketone removed from the mixture by evaporation was replaced.

A portion of the prepared isocyanate terminated polyurethane was cured at about 25° C. by mixing 13.7 parts of the curative solution with 100 parts of the diluted prepolymer prepared according to Example I. This mixture had a pot life of 5 minutes. The mixture was used to prepare a film of cured polyurethane having a thickness of about 12 mils and an ultimate tensile strength of 4700 pounds per square inch at an elongation of 690 percent.

Another portion of the prepared isocyanate terminated polyurethane was cured at about 25° C. by mixing 100 parts of the diluted prepolymer with 13.7 parts of the curative solution which had been treated by adding 3.4 parts of anhydrous calcium sulfate to the curative solution and allowing it to stand for about 24 hours at about 25° C. The calcium sulfate was removed before mixing the curative solution with the polyurethane. The mixture had a pot life of 13 minutes. A film was prepared from the mixture on a polyethylene surface having a thickness of about 12 mils, an ultimate tensile strength of 2700 pounds per square inch and an elongation of 530 percent.

EXAMPLE V

An isocyanate-terminated polyurethane (the prepolymer) was prepared according to the method of Example I.

A curative solution was then prepared by mixing 100 parts m-xylylene diamine and 400 parts methyl ethyl ketone at about 25° C. The mixture was allowed to stand for about 24 hours at about 25° C.

A portion of the prepared isocyanate terminated polyurethane was cured at about 25° C. by mixing 16 parts of the curative solution with 100 parts of the diluted prepolymer prepared according to Example I. This mixture had a pot life of 5 minutes. The mixture was used to prepare a film of cured polyurethane having a thickness of about 12 mils and an ultimate tensile strength of about 5000 pounds per square inch at an elongation of 500 percent.

Another portion of the prepared isocyanate terminated polyurethane was cured at about 25° C. by mixing 100 parts of the diluted prepolymer with 16 parts of the curative solution which had been treated by adding 3.4 parts of anhydrous calcium sulfate to the curative solution and allowing it to stand for about 24 hours at about 25° C. The calcium sulfate was removed before mixing the curative solution with the polyurethane. The mixture had a pot life of 11 minutes.

As already discussed in this specification, isocyanate terminated polyurethanes suitable for use in this invention are prepared by reacting a polyisocyanate with a reactive hydrogen containing polymeric material. Representative examples of some of the various isocyanate terminated polyurethanes (also called prepolymers) suitable for substitution for the prepolymer described in Example I are the following prepolymers:

PREPOLYMER A

A reaction product of 2 mols of 4,4'-dicyclohexylmethane diisocyanate with about 1 mol of a polyester having a molecular weight of from about 1000 to about 2000 formed by condensing an excess of ethylene glycol with adipic acid.

PREPOLYMER B

Same as Prepolymer A except that about 1.5 mols of the diisocyanate are reacted with the polyester.

PREPOLYMER C

Same as Prepolymer A except propylene glycol was used to produce the polyester instead of ethylene glycol.

PREPOLYMER D

The reaction product of 2 mols of 4,4'-dicyclohexylmethane diisocyanate with about 1 mol of a polytetramethylene ether glycol having a molecular weight of about 1000 to about 3000.

PREPOLYMER E

The reaction product of 2 mols of 4,4'-dicyclohexylmethane diisocyante with about 1 mol of a polyester having a molecular weight of from about 1000 to about 2000 prepared by the condensation of adipic acid with an excess of a mixture consisting of 80 percent by weight ethylene glycol and 20 percent by weight propylene glycol.

PREPOLYMER F

The reaction product of 2 mols of 4,4'-dicyclohexylmethane diisocyanate with about 1 mol of a mixture of polyesters having molecular weights of about 1500 to about 2000 prepared by polyester mixture comprised two-thirds by mol weight of a polyester prepared by the condensation of adipic acid with an excess of a mixture consisting of 80 percent by weight ethylene glycol and 20 percent by weight propylene glycol and one-third by mol weight of a polyester prepared by the condensation of 1,4-butane diol and adipic acid.

PREPOLYMER G

The reaction product of 2 mols of 4,4'-dicyclohexylmethane diisocyanate with about 1 mol of a mixture of polyesters wherein the said mixture of polyesters comprises 50 percent by mol weight of polyester having a molecular weight of about 1800 to about 2000 prepared by the condensation of 1,4-butane diol with azelaic acid, and 50 percent by mol weight of a polyester having a molecular weight of from about 800 to about 1200 prepared by the condensation of 1,4-butane diol and adipic acid.

Thus, in the practice of this invention, compositions of matter which are useful as curatives for isocyanate polyurethanes can be prepared by treating a mixture comprising at least one diamine, where the amino groups of the diamine are connected to non-benzenoid carbon atoms, and a liquid ketone with a nonreactive drying agent. The cured polyurethanes prepared thereby can be used as coatings for various structures and fabrics such as sheet materials, tires, belts, and various industrial products, as well as various molded articles.

Representative diamine-ketone mixtures suitable for this invention include, for example, diamines selected from the group consisting of ethylene diamine, hexamethylene diamine, isophorone diamine, 1,4-cyclohexane bis methylamine and m-xylylene diamine, with ketones selected from the group consisting of acetone, methyl ethyl ketone, methyl isobutyl ketone and methyl isoamyl ketone, as well as a diamine such as 4,4'-diaminodicyclohexylmethane and ketones such as acetone and methyl ethyl ketone.

When these treated curative compositions of matter are used to cure the isocyanate-terminated polyurethanes of this invention, the pot life or gel time of the resulting reaction mixture is generally increased by at least 10 percent and usually at least from about 20 to about 100 percent or more, depending somewhat upon the diamine-ketone mixture and isocyanate-terminated polyurethane used as well as reaction conditions, as compared to using such curatives which have not been treated with drying agents.

It is understood that it is within the scope of this invention to prepare cured polyurethanes with the treated diamine-ketone curatives of this invention by reacting the said curatives with a mixture comprising the polyisocyanate and the reactive hydrogen-containing material as well as with the reaction product of such a mixture.

While certain representative embodiments and details have been shown for the purpose of illustrating the invention, it will be apparent to those skilled in the art that various changes and modifications may be made therein without departing from the spirit or scope of the invention.

What is claimed is:

1. A method of preparing a composition of matter comprising treating a mixture of 1 part by weight of at least one diamine selected from aliphatic, cycloaliphatic and aryl aliphatic diamines, where the amino groups of the diamine are attached to nonbenzenoid carbon atoms, and from about 1 to about 5 parts by weight of at least one liquid ketone with at least 0.1 part of a solid inorganic drying agent inert to diamines and ketones per part by weight of the diamine-ketone mixture wherein the carbon-to-oxygen ratio of the liquid ketone is from 2.5 to about 7, the carbon-to-nitrogen ratio of the diamine is from 1 to about 7, and the sum of the carbon-to-oxygen ratio of the ketone and the carbon-to-nitrogen ratio of the diamine is from about 3.5 to about 11.

2. A composition of matter prepared according to the method of claim 1 by treating a mixture of 1 part by weight of at least one diamine selected from aliphatic, cycloaliphatic and aryl aliphatic diamines, where the amino groups of the diamine are connected to non-benzenoid carbon atoms, and from about 1 to about 5 parts by weight of at least one liquid ketone with at least about 0.1 part of a solid inorganic drying agent inert to diamines and ketones per part by weight of the diamine-ketone mixture wherein the carbon-to-oxygen ratio of the liquid ketone is from 2.5 to about 7, the carbon-to-nitrogen ratio of the diamine is from 1 to about 7, and the sum of the carbon-to-oxygen ratio of the ketone and the carbon-to-nitrogen ratio of the diamine is from about 2.5 to about 11.

3. A composition of matter according to claim 2 wherein the diamines are selected from the group consisting of ethylene diamine, hexamethylene diamine, isophorone diamine, 1,4-cyclohexane bis methylamine, 4,4'-diaminodicyclohexylmethane and m-xylylene diamine.

4. A composition of matter according to claim 3 where the ketones are selected from the group consisting of acetone, methyl ethyl ketone, methyl isobutyl ketone, methyl isoamyl ketone and acetyl acetone.

5. A composition of matter according to claim 4 where the drying agent is selected from magnesium sulfate, calcium sulfate, calcium chloride, calcium oxide, sodium sulfate and sodium carbonate.

6. A composition of matter according to claim 5 where the diamine is ethylene diamine and the drying agent is calcium oxide.

7. A method according to claim 1 where the diamines are selected from the group consisting of ethylene diamine, hexamethylene diamine, isophorone diamine, 1,4-cyclohexane bis methylamine, 4,4'-diaminodicyclohexylmethane and m-xylylene diamine, and wherein the ketone is selected from the group consisting of acetone, methyl ethyl ketone, methyl isobutyl ketone, methyl isoamyl ketone and acetyl acetone.

8. A method according to claim 7 where the drying agent is selected from magnesium sulfate, calcium sulfate, calcium chloride, calcium oxide, sodium sulfate and sodium carbonate.

9. A method according to claim 8 where the diamine is ethylene diamine and the drying agent is calcium oxide.

References Cited

UNITED STATES PATENTS

| | | | |
|---|---|---|---|
| 3,267,078 | 8/1966 | Damusis | 260—77.5 |
| 3,281,396 | 10/1966 | Barnes | 260—75 |

OTHER REFERENCES

Systematic Organic Chemistry, Cumming et al., Van Nostrand, New York (1925), pp. 33–34.

Laboratory Technique in Organic Chemistry, Morton, McGraw-Hill, New York (1938), pp. 1–9.

RICHARD D. LOVERING, Primary Examiner

I. GLUCK, Assistant Examiner

U.S. Cl. X.R.

252—182; 260—2.5, 18, 75, 77.5